2 Sheets—Sheet 1.

J. D. JONES.

GRAIN DRILL.

No. 7,255. Reissued Aug. 8, 1876.

Witnesses

Alexander Wallace

Samuel Erwin

Inventor

James D. Jones.

N. PETERS, PHOTO-LITHOGRAPHER, WASHINGTON, D. C.

2 Sheets—Sheet 2.

J. D. JONES.

GRAIN DRILL.

No. 7,255. Reissued Aug. 8. 1876.

Witnesses

Alexander Wallace

Samuel Erwin

Inventor

James D. Jones.

N. PETERS, PHOTO-LITHOGRAPHER, WASHINGTON, D. C.

UNITED STATES PATENT OFFICE.

JAMES D. JONES, OF COLUMBIANA, OHIO, ASSIGNOR, BY MESNE ASSIGNMENTS, TO WM. W. WALLACE, OF PITTSBURG, PENNSYLVANIA.

IMPROVEMENT IN GRAIN-DRILLS.

Specification forming part of Letters Patent No. 49,882, dated September 12, 1865; reissue No. 7,255, dated August 8, 1876; application filed May 22, 1876.

*To all whom it may concern:*

Be it known that I, JAMES D. JONES, formerly of Pittsburg, Pennsylvania, but now of Columbiana, in the county of Columbiana and State of Ohio, have invented a certain new and useful Improvement in Grain-Drills; and I do hereby declare that the following is a full, clear, and exact description thereof, reference being had to the accompanying drawings, and to the letters of reference marked thereon.

My invention relates to an improvement in grain-drills; and consists, first, in furnishing the seed-hopper with a cut-off plate and adjustable gage-plates, for regulating the flow of seed from the hopper through the chutes into the bore of the drilling-teeth; second, in an arrangement of the drill-teeth whereby they may be straggled independently of each other, in rows parallel to the axle; third, in combining with the teeth, susceptible of being straggled at the will of the operator, reversible chutes or conductors for conveying the seed from the hopper to the teeth when straggled; fourth, in an adjustable arrangement of bearings, lever-bar, and rods for controlling the position of the cut-off plate with relation to the hopper, and making the teeth operative and inoperative.

To enable others skilled in the art to which my invention is most nearly connected to make and use it, I will proceed to describe its construction and operation.

Figure 1:
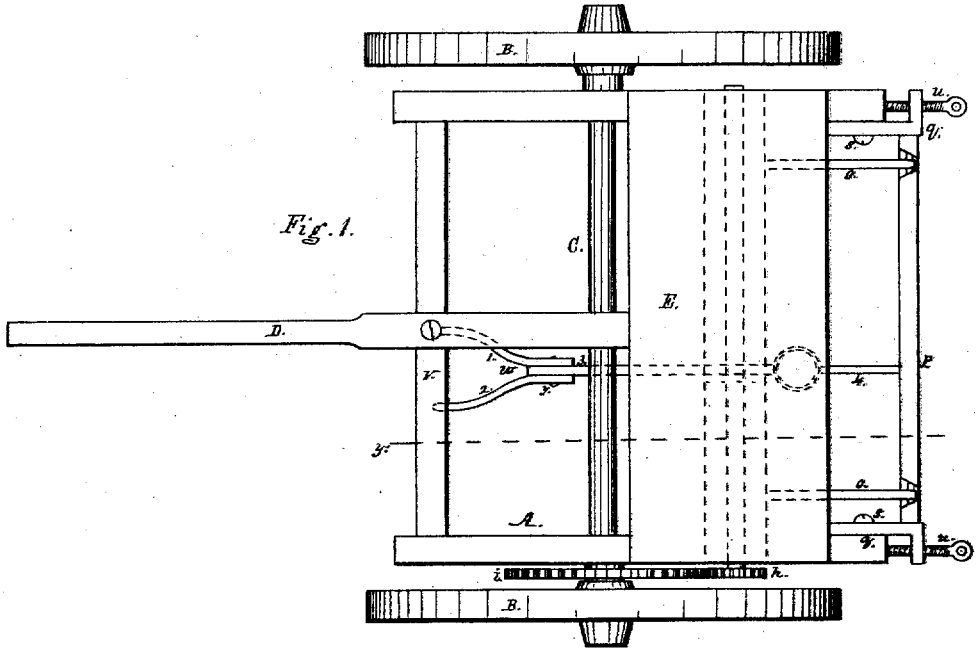
Figure 2:
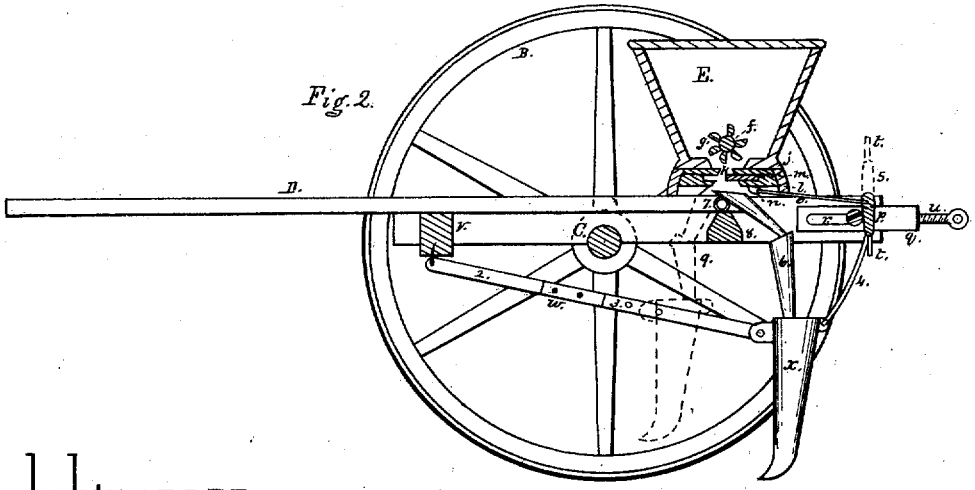
Figure 3:
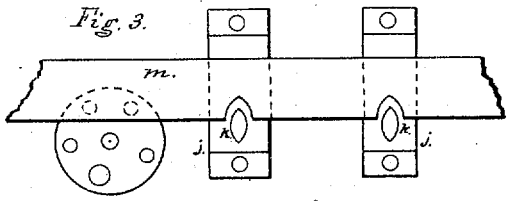
Figure 4:
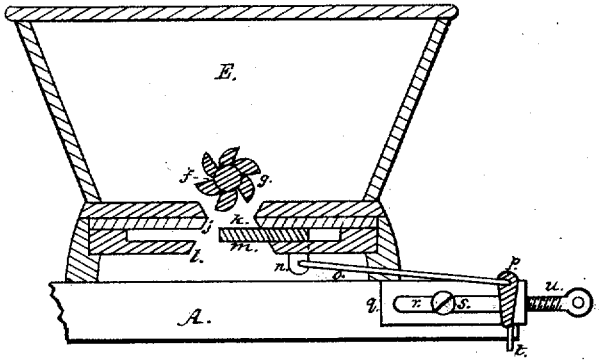

In the accompanying drawings, which form part of my specification, Figure 1 is a top view or plan of my improvement in grain-drills. Fig. 2 is a vertical section of the same at line $y''$ of Fig. 1. Fig. 3 is a detail section of the cut-off plate and gage-plates. Fig. 4 is a vertical and transverse section of the seed-hopper and agitator.

In the accompanying drawings, A represents the frame of the grain-drill. B B represent the wheels, which are secured permanently to the axle C, which is pivoted to the frame A by suitable bearings. D represents the tongue, which is also secured to the frame A. The seed-hopper E is secured on the frame A, and is furnished with a shaft, *f*, extending longitudinally through the hopper, and is provided with a series of agitators, *g*. On one end of the agitating-shaft *f* is secured a small cog-wheel, *h*, which gears into a wheel, *i*, on the axle C. In the bottom of the seed-hopper E are a number of openings, corresponding to the number of drill-teeth used. Over these openings, on the shaft *f*, are the agitators *g*. On the under side of the bottom of the hopper E, directly under the openings in the bottom, are placed gage-plates *j*, furnished with oval-shaped openings *k*.

Over the gage-plates *j* are placed plates *l*, having openings which are larger than the openings *k*. Between the plates *j* and *l* is a recess, in which is placed the cut-off plate *m*, in one edge of which are notches, corresponding in number, form, size, and position to the number of gage-plates *j* and openings *k*. Each end of the cut-off plate is furnished with a lug, *n*, to which are connected rods *o*, attached to a bar, *p*, pivoted in adjustable bearings *q*, furnished each with a slot, *r*, in which is placed a set-screw, *s*, for holding the bearings *q* in their adjusted position. The bar *p* is provided with a handle, *t*, for turning it on its axis for moving the cut-off plate *m*, so as to increase, diminish, or close the openings *k* of the gage-plates *j*, as may be desired by the operator. The adjustable bearings *q* are adjusted by means of adjusting-screws *u*, for the purpose of adjusting the cut-off plate *m* and controlling the depth of drilling in the seed. To the front *v* of the frame A are attached the forward ends of the drag-bars *w*, to the rear ends of which are attached drill-teeth *x*, of the ordinary construction. The drag-bars *w* are constructed of flat bars of wrought-iron, and made in three parts, 1 2 3, bolted together at *y*. The part 3 of the drag-bars is furnished with a series of openings for the purpose of shortening them so as to bring forward alternately the drill-teeth *x*, as indicated by dotted lines in Fig. 2.

The object of straggling the drill-teeth is to obtain room between the teeth, in stony and rooty ground, to prevent clogging of the teeth.

To the drill-teeth *x* are attached cords or chains 4, which are connected to the pivoted bar *p*. By this arrangement the teeth *x* can be raised and lowered, at the will of the operator, by simply turning the bar *p* on its pivots, as indicated by the dotted lines at 5. By connecting the drill-teeth to the bar *p*, as hereinbefore described, they can be with ease made inoperative, and also adjusted as to the depth of drilling in the seed.

The chutes 6, for conducting the seed from the hopper into the bore of teeth, are of the ordinary construction, excepting the upper part of them, which are furnished with loops or hinges for connecting them to the beveled bar 8, directly under the hopper E. By this arrangement of the loops or hinges 7 on the upper part of the chutes 6, they can be easily reversed in position to suit the straggling of the teeth *x*, as indicated at 9 in Fig. 2.

From the foregoing description, and by reference to the accompanying drawings, the skillful mechanic will readily understand the construction of my improvements in grain-drills. I will, therefore, proceed to describe its operation, which is as follows: Having the cut-off plate *m* adjusted for allowing the desired quantity of seed to flow through the openings *k* of the gage-plates *j*, the hopper E is charged with the desired kind of seed. The forward movement of the drill will revolve the wheels B B, which will revolve the axle C and the wheel *i*, which will revolve the wheel *h*, shaft *f*, and agitators *g*, which will prevent the openings *k* from clogging with seed, and cause it to flow into the openings, from which it passes down through the chutes 6, from which it flows into the bore of the teeth *x*, and, passing down through them, is deposited in the furrows made by the teeth *x*. If the operator desires to increase the quantity of seed in the operation of sowing it, he moves the adjustable bearings *q* outward by means of the adjusting-screws *u*, and if he desires to diminish the quantity of seed in the operation of sowing, he moves the bearings *q* inward by means of the screws *u*. The depth of drilling is regulated by manipulating the bar *p*, and adjusting the chains 4 as to their length. The teeth are made inoperative by turning the bar *p* until the handle *t* is in the position indicated by the dotted lines in Fig. 2.

The advantages of my improvement in grain-drills, briefly stated, are as follows: First, in providing a means for regulating the quantity of seed in sowing, through the medium of the gage-plates and adjustable cut-off plates. Second, in furnishing a simple and efficient means for straggling the drill-teeth at the will of the operator, through the medium of the adjustable drag-bars, or their equivalent. Third, in the arrangement of reversible chutes for conducting the seed to the drill-teeth when they are straggled. Fourth, in the means provided for regulating the depth of drilling in the seed, and rendering the drill-teeth inoperative, through medium of the adjustable bearings and the pivoted bar to which the teeth are connected, whereby all the drill-teeth can be raised or lowered by simply turning the bar on its axis.

Having thus described my improvement, what I claim as of my invention is—

1. In a grain-drill, the combination of the agitators *g*, gage-plates *j*, cut-off plates *m*, connecting-rods *o*, pivoted bar *p*, adjustable bearings *q*, and seed-hopper E, substantially as herein described, and for the purpose set forth.

2. In a grain-drill, the reversible chutes or conductors, in combination with the seed-hopper and adjustable drill-teeth adapted to be straggled, substantially as hereinbefore described, and for the purpose set forth.

3. In a grain-drill, adjustable teeth adapted to be straggled independently, substantially as hereinbefore described, and for the purpose set forth.

4. In a grain-drill, adjustable teeth, each one of which is adapted to be moved forward and back by means of an adjustable drag-bar, for the purpose of arranging said teeth in parallel rows, so that each tooth of the series may be made to occupy a position independently of any other, substantially as hereinbefore described, and for the purpose set forth.

5. In a grain-drill, the combination of the adjustable bearings *q*, pivoted bar *p*, and chains 4 with the drill-teeth, substantially as hereinbefore described, and for the purpose set forth.

JAMES D. JONES.

Witnesses:

ALEXANDER WALLACE,
SAMUEL ERWIN.